United States Patent
Varela et al.

(10) Patent No.: US 8,059,651 B2
(45) Date of Patent: Nov. 15, 2011

(54) METHOD FOR RECOVERING LOST HEADER

(75) Inventors: Ruth A. Varela, Rolling Meadows, IL (US); Joseph E. Baum, Cary, IL (US); Ronald V. Gillis, Elburn, IL (US); Mary M. Valdivia, Lake Zurich, IL (US); Hania A. Yassin, West Chicago, IL (US); Xiaoming Zhao, Naperville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 308 days.

(21) Appl. No.: 11/958,014

(22) Filed: Dec. 17, 2007

(65) Prior Publication Data

US 2009/0154460 A1 Jun. 18, 2009

(51) Int. Cl.
*H04L 12/56* (2006.01)
(52) U.S. Cl. ........ 370/392; 370/389; 370/477; 370/338; 709/246
(58) Field of Classification Search .................. 370/389, 370/521, 477, 338, 328, 392; 709/246
See application file for complete search history.

(56) References Cited

U.S. PATENT DOCUMENTS

| 2003/0123485 | A1* | 7/2003 | Yi et al. ................... 370/477 |
| 2003/0154301 | A1* | 8/2003 | McEachern et al. .......... 709/237 |
| 2004/0034717 | A1* | 2/2004 | Pelletier et al. ............... 709/246 |
| 2005/0008012 | A1  | 1/2005 | Koren et al. |
| 2005/0094670 | A1* | 5/2005 | Kim ............... 370/477 |
| 2007/0002850 | A1* | 1/2007 | Guichard et al. ............. 370/389 |
| 2009/0141715 | A1* | 6/2009 | Yi et al. ................... 370/389 |

FOREIGN PATENT DOCUMENTS

EP 1137237 A2 9/2001

* cited by examiner

*Primary Examiner* — Dang Ton
*Assistant Examiner* — Mohamed Kamara

(57) ABSTRACT

A method is disclosed that includes sending (304) a first full header from a source compressor (106) to a destination decompressor (112) wherein the source compressor and the destination decompressor are a part of a symmetrical configuration. An IP packet including the full header is compressed into a first compressed header (310) based on the context established in the first full header. The first compressed header is sent (312) from the source compressor to the destination decompressor. The compressor receives (322) a second full header from the destination compressor wherein the second full header indicates that the destination decompressor did not receive the first full header. The second full header can include a modified field or has an incremented generation identification. The source compressor sends (336) another full header to the destination decompressor.

19 Claims, 8 Drawing Sheets

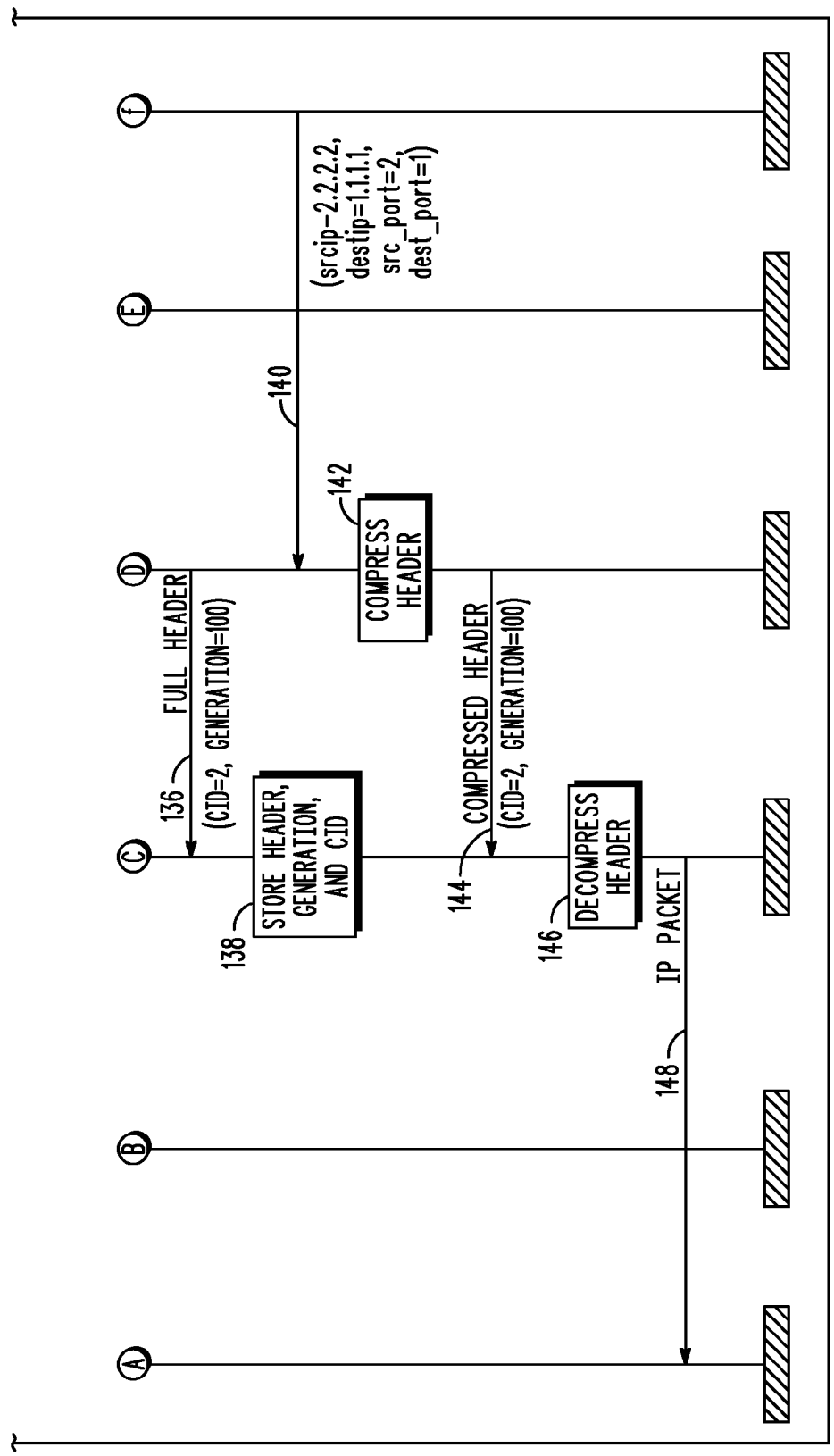
FIG. 1B —PRIOR ART—

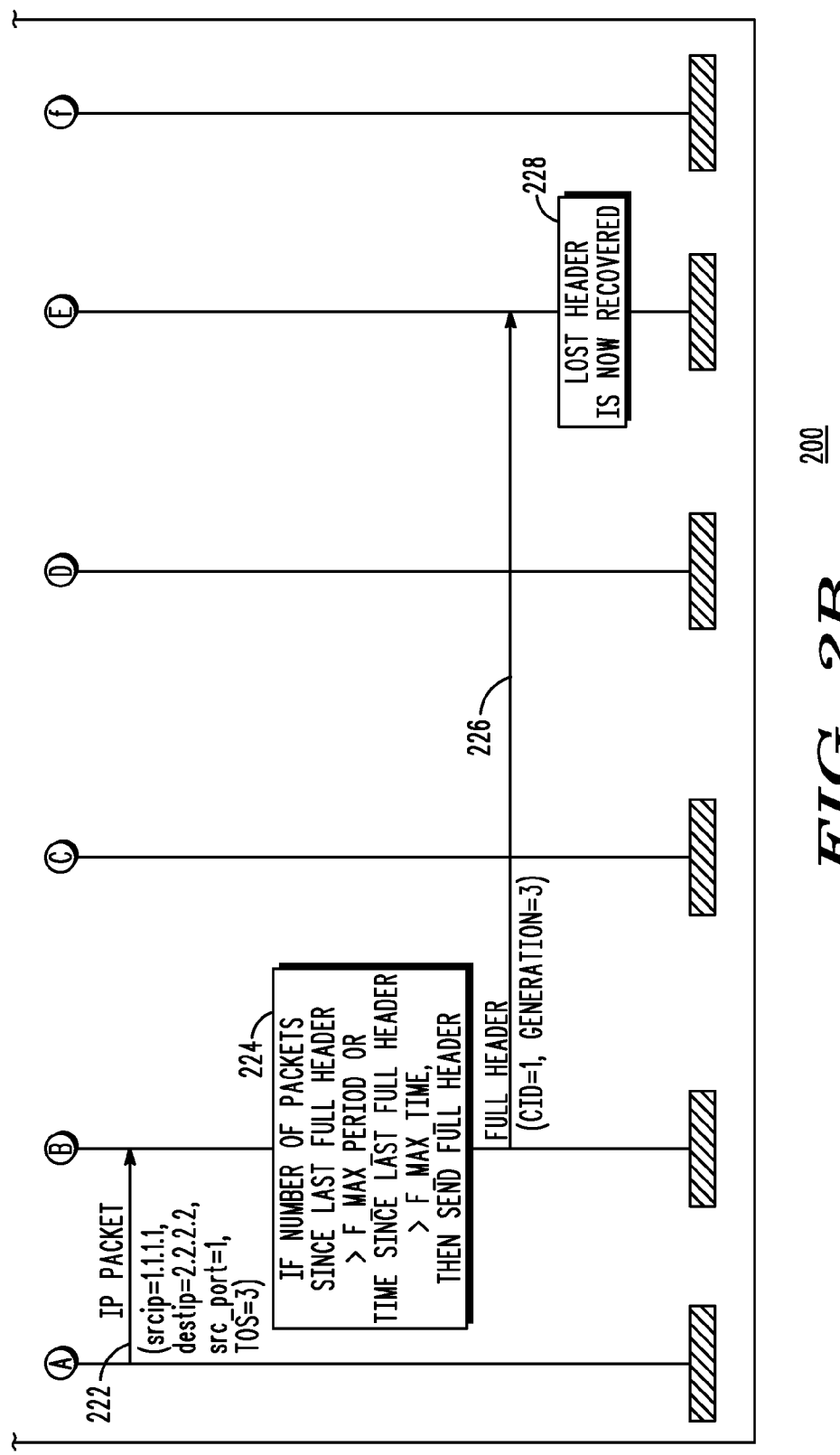
FIG. 2B –PRIOR ART–

METHOD FOR RECOVERING LOST HEADER

FIELD OF THE INVENTION

The present invention relates generally to recovering lost headers and, in particular, recovering a full header after an unrecognized compressed header is received.

BACKGROUND

There are many varieties of header compression including RFC 2507 header compression. Header compression provides numerous advantages on low- or medium-speed links. These advantages include improving interactive response times, allowing the use of small packets for bulk data with good line efficiency, allowing the use of small packets for delay sensitive low data-rate traffic, decreasing header overhead and reducing packet loss rate over lossy links. Headers that can be compressed include TCP, UDP, IPv4 and IPv6 base and extension headers. For non-TCP headers such as UDP/IP headers, compression slow-start and periodic header refreshes permit periods of packet discard after loss of a header that changes the context. There are hooks for adding header compression schemes on top of UDP.

Header compression relies on many fields being constant or changing seldomly in consecutive fields belonging to the same packet stream. The general principle of header compression is to occasionally send a packet with a full header and subsequent compressed headers refer to the context established by the full header and may contain incremental changes to the context. An uncompressed header updates or refreshes the context for a packet stream. It carries a context identification that will be used to identify the context for the packet stream. Full headers for non-TCP packet streams also carry the generation of the context they update or refresh using a generation identification.

An issue with header compression and header compression using RFC 2507 is that the packet containing the full header can be lost between the source and the destination, which is more likely in wireless mobile environments. If the full header is lost, all other packets in the stream will still be compressed by the source but the destination cannot decompress the compressed stream because it has no information to understand the compression.

Recovery mechanisms are known for lost header compression information within RFC 2507 and other header compression techniques. One mechanism is to refresh the context by sending a full header after X packets or Y period of time. These mechanisms, however, are not optimal. If X or Y are too large, then many undecodable messages are sent from the source and the destination such that time and data is lost. On the other hand if X and Y are too small, then there is not much compression because full headers are being sent more often.

In view of the foregoing, there is a need to provide an efficient mechanism for refreshing full headers between and a source and a destination to optimize the benefits of header compression.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 1A and 1B are an example of a message sequence chart of standard header compression where the full header sent by the source is received by the destination.

FIGS. 2A and 2B are an example of a message sequence chart of standard header compression where the full header is lost between the source and the destination and is recovered according to the prior art.

Figure 1A:
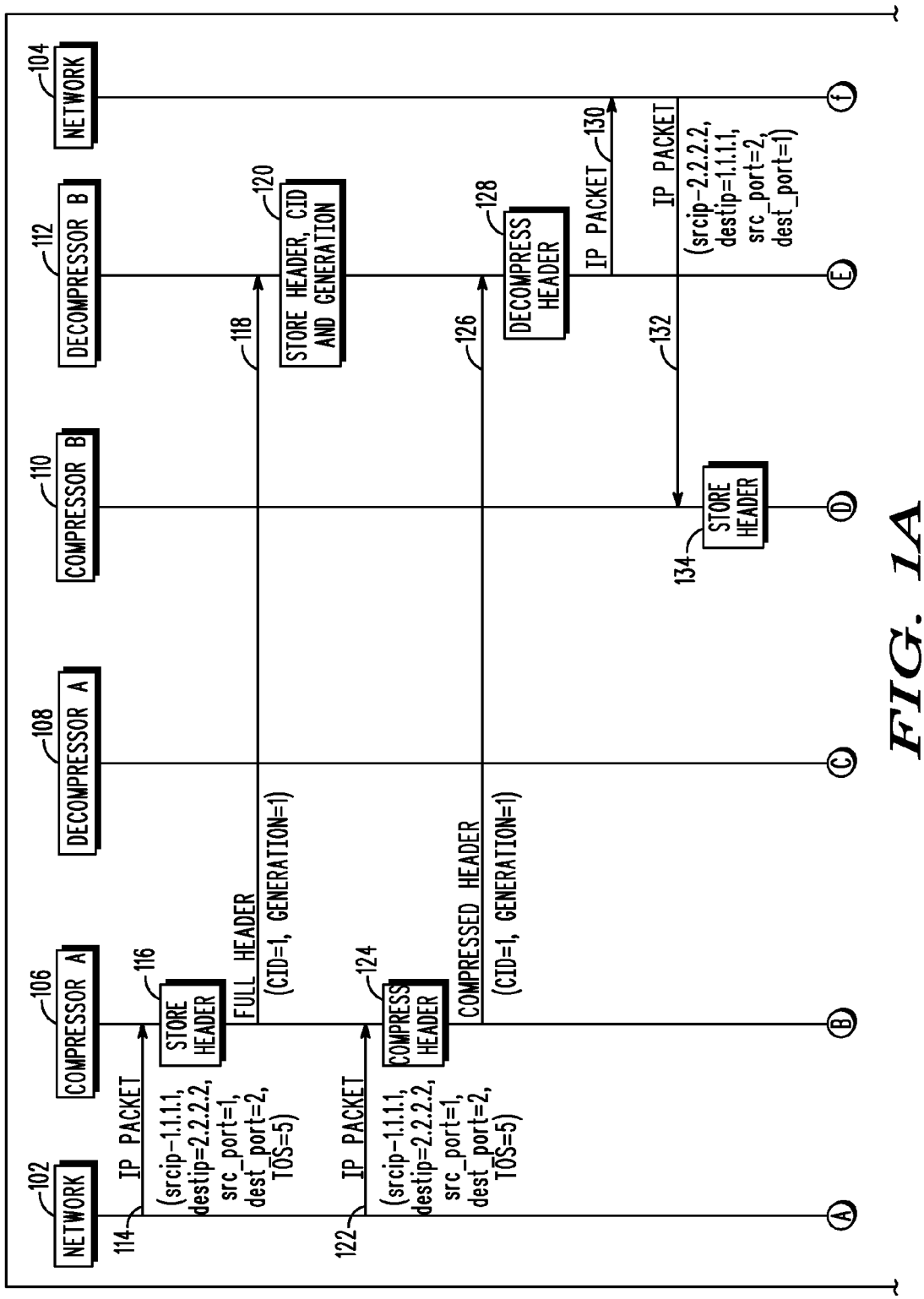

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method of recovering a full header during header compression after a full header is lost between a source and a destination. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of recovering a lost full header during header compression described herein. The non-processor circuits may include, but are not limited to, a radio receiver, a radio transmitter, signal drivers, clock circuits, power source circuits, and user input devices. As such, these functions may be interpreted as steps of a method to perform a method of recovering a full header that has been lost between a source and a destination during header compression. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention is directed to a method for refreshing a full header during header compression when the full header that is sent by a source compressor is lost and not received by a destination compressor. The method includes sending a first full header from a source compressor to a destination decompressor wherein the source compressor and the destination decompressor are a part of a symmetrical configuration within a communication network including a wireless communication network. The method also includes compressing the full header into a first compressed header and sending the first compressed header from the source compressor to the destination decompressor. The source decompressor can receive a second full header from the destination compressor wherein the second full header indicates that the destination decompressor did not receive the first full header. Upon receipt of the second full header by the source, the source compressor sends a third full header from the source compressor to the destination decompressor. In an embodiment of the invention, the first, second and third full headers include a context identification and a generation identification and the generation identification of the second full header is incremented from a previous generation identification to indicate that the destination did not receive the first full header, which is needed by the destination to decompress the compressed header for use by the destination. In another embodiment, the second full header includes a modified generation identification to indicate that the destination decompressor did not receive the first full header. The method may also include detecting that the destination decompressor did not receive the first full header upon receiving the second full header by detecting that a generation identification is incremented. In order for the source and the destination to complete header compression, the method can include storing the first full header. At the destination, the method also includes comparing the second full header to the stored first full header to determine if the destination decompressor received the first full header. Moreover, comparing the second full header to the stored first full header includes determining that the generation identification of the second full header is incremented from the stored first full header.

In another embodiment of the invention, a method is provided that includes receiving a decompressed header and determining if the decompressed header is recognized. If the compressed header is not recognized, the method includes incrementing a field in a first full header and sending the first full header with the incremented field from a destination network to a source decompressor. The method concludes by receiving a second full header. In an embodiment, the full headers include a context identification and a generation identification where the incremented field is a generation identification sent from the destination decompressor to the source decompressor. In an embodiment, a destination includes the destination decompressor and a destination compressor and a source includes the source decompressor and a source compressor so that the source and the destination have a symmetrical configuration. In another embodiment, the method includes receiving a second compressed header and determining that the second compressed header corresponds to the received second full header to ensure that the second full header was received. In addition, the method can include receiving the first full header, storing the first full header and storing the decompressed header. Moreover, the method may include determining if the first compressed header is recognized comprises comparing the decompressed header to the stored decompressed header.

Turning to FIGS. 1A and 1B, message sequence chart 100 depicts normal header compression where no packets between a source and a destination are lost. In an embodiment, FIGS. 1A and 1B illustrate normal RFC 2507 header compression procession. In an embodiment, the header compression is conducted for messages and data sent between a first network 102 and a second network 104. First and second networks 102, 104 include various network components (not shown) that provide wireless and wired communication between various communication devices (not shown) that operate on the network. The communication devices include cellular phones, personal digital assistants, lap top computers, personal computers and the like. These components provide communication services to multiple users, and there operations are known by those of ordinary skill in the art. The relevant components within the first and second networks 102, 104 are described more fully below.

First network 102 includes a compressor 106 and a decompressor 108 that are used to compress and decompress data that is sent and received, including headers, between the first and second networks 102, 104. In addition, second network 104 includes a compressor 110 and decompressor 112 that are also are used to compress and decompress data that is sent and received, including headers between the second and first networks 104, 102. The arrangement of compressors 106, 110 and decompressors 108, 112 within the first and second networks 102, 104 provide for a symmetrical configuration of networks between the first and second networks. As the networks are symmetrical, the first network can compress data and headers which can be decompressed by the second network, and the second network can compress data and header that can be decompressed by the first network.

To begin, first network 102 sends 114 an IP packet to the first network's compressor 106. The IP packet is from the first network 102 that is serving as a source network and is to be sent to the second network 104 that is serving as a destination. As first network 102 and second network 104 are symmetrical, second network 104 can serve also as a source network and first network 102 can serve as a destination network. The IP packet has an address, such as an IP address, for its source and an address, such as an IP address, for its destination. The IP packet may also have a source port for its source and a destination port for its destination. In addition, the IP packet may also include a type-of-service (TOS) data associated with itself.

The compressor 106 stores 116 the full header that is received from the network 102. The full header establishes the context for the packet stream identified by the IP packet. The full header the includes fields for the source address, the destination address, the source port and the destination port, which can identify the packet stream for the IP packet. The full header is sent 118 from the source compressor to the destination decompressor 112 with a context identification (CID) and a generation identification (generation ID.) The CID is a small unique number identifying the context that should be used to decompress a compressed header. The CID is carried in full headers and compressed headers so that compressors and decompressors can associate the full headers and compressed headers to one another. Context is the state that the compressor uses to compress a header and the decompressor uses to decompress a header. The context is the uncompressed version the last header sent or received over the link. Generation ID is for each new version of the context for a given CID that is associated with a generation. The generation ID is a small number that is incremented whenever the context associated with the CID changes.

Upon receipt of the full header, the destination network's 104 decompressor 112 stores 120 the full header together with the CID and generation ID associated with that header. YH4 After sending the full header to the destination network 104, the source network sends 122 another IP packet in the packet stream having a similar header as the IP packet sent in step 114, which includes the same addresses, ports and TOS as before, to the source network's compressor. Based on the context established in step 118, the compressor compresses 124 the IP packet header into a compressed header. The compressor then sends 126 the compressed header from the source network 102 to the decompressor 112 of the destination network 104 with the CID and generation ID of the full header. Upon receipt of the compressed header, the decompressor 112 can decompress 128 the header by associating the CID and generation ID with a stored CID and generation ID. Thus, if the decompressor has a stored full header with the same CID and generation ID as the compressed header received with that CID and generation ID, the decompressor decompresses the compressed header by using the stored header. The decompressed header and IP packet is then sent 130 from the decompressor 112 to the network 104. If no CID and generation ID pairing matches with a stored CID and generation ID then the original full header was lost and not received by the destination network 104 and its decompressor 112.

As noted, networks 102 and 104, compressors 106 and 110 and decompressors 108 and 112 are symmetrical. Thus, steps 114-130 can be conducted by the destination network 104 in steps 132-148. For example, an IP packet is sent 132 from network 104 to its compressor 110 where the full header for the IP packet with a CID and generation ID is stored 134. The full header and CID and generation ID is sent 136 to the decompressor 108 of network 102 where the full header is also stored 138. An IP packet is sent 140 from network 104 to the compressor 110 and a compressed header for the CID and generation ID is created 142. The compressed header with an associated CID and generation ID is sent 144 to the decompressor 108 on network 102. The decompressor 108 decompresses 146 the compressed header and sends 148 the IP packet to network 102.

Figure 2A:
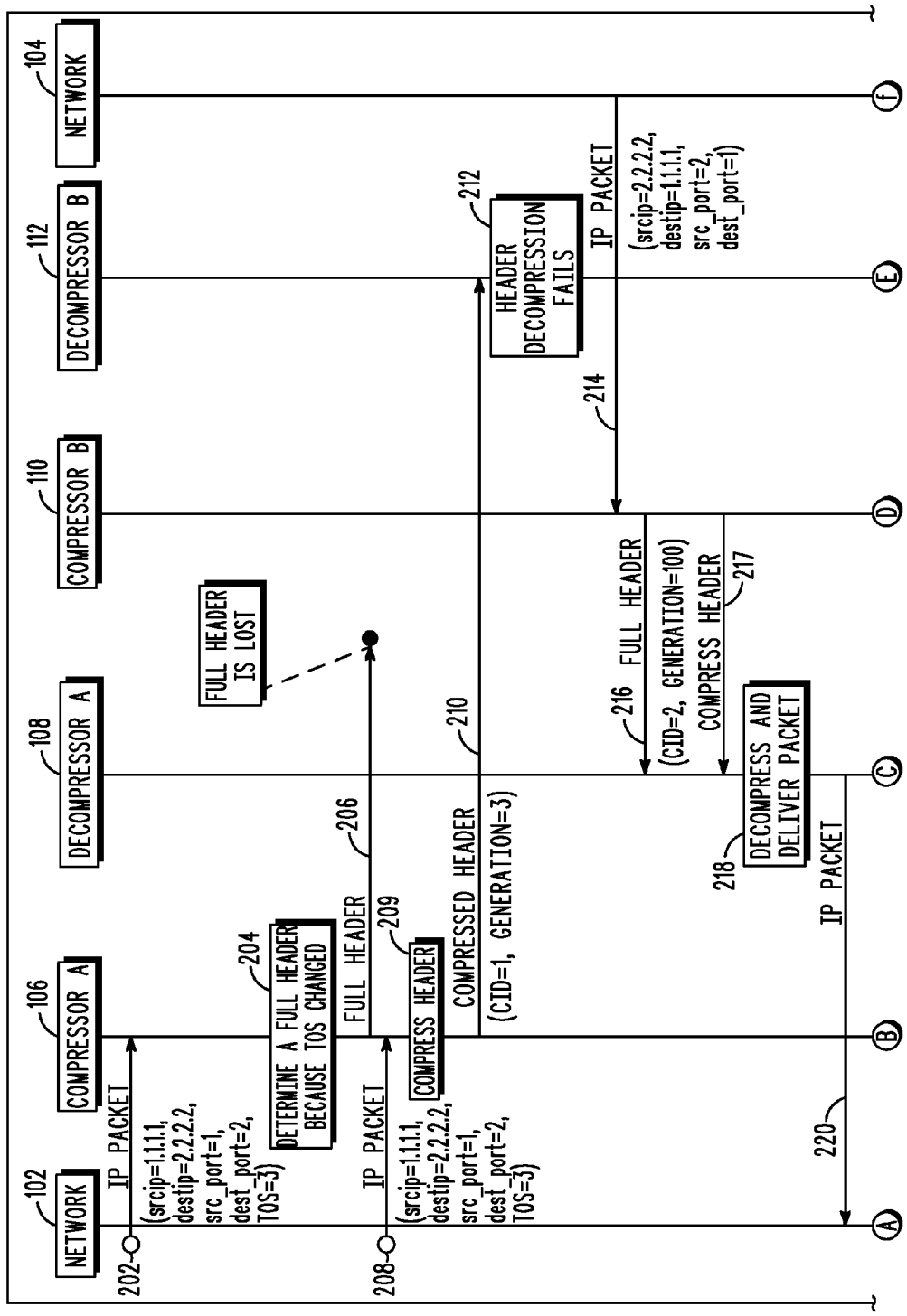

FIGS. 2A and 2B are a message control sequence 200 that illustrates header compression, and header compression for RFC 2507, where a full header is recovered by a network 104 and decompressor 112 after being lost between network 102 and network 104 according to the prior art. The message sequence begins by network 102 sending 202 an IP packet to its compressor 106. As mentioned, the IP packet includes a source address, destination address, source port, destination port and TOS. When a TOS changes between packets or for other changes in the header, compressor 106 determines 204 a new full header is to be sent to decompressor 112 and network 104. The full header is assigned a CID and a generation ID. Compressor 106 sends 206 the full header to decompressor 112 and network 104. As can be understood, a full header can be lost between the compressor 106 and decompressor 112. When a full header is lost, the decompressor cannot decompress a compressed header when it is received because the decompressor does not have the necessary data such as a CID and generation ID stored to obtain the full header corresponding the compressed header.

After the full header is sent, the network 102 sends 208 the compressor 106 an IP packet, which is then compressed 209 into a compressed header. The compressed header is sent 210 from the compressor 106 to the decompressor 112 on network 104. The compressed header is sent with the CID and generation ID that was associated with the header that was lost. At step 212 header decompression fails 212 because the decompressor did not receive the full header, which is determined when the decompressor does not recognize the CID and generation ID of the compressed header. As a part of the communication activity between network 104 and network 102 and not as a part of an attempt to recover from the lost IP full header, network 104 sends 214 an IP packet to its compressor 110. The IP packet includes a source IP address, a destination IP address, source port, destination port. The full header that is assigned a CID and generation ID is sent 216 from the compressor 110 to the decompressor 108. In an embodiment, a compressed header is also sent 217 from the compressor 110 to the decompressor 108 where the compressed header has same the CID and generation ID of the full header. The decompressor decompresses 218 the compressed header upon receipt using the CID and generation ID and associated it with the full header having the same CID and generation ID. The decompressed IP packet is then sent 220 from the decompressor to the network 102.

In the meantime, network 102 continues to send compressed IP packets to network 104. As the full header was lost, these compressed headers cannot be decompressed by the decompressor 106 of network 104. Header compression according RFC 2507 includes a refresh option 224. A refresh of the full header occurs after the number of packets using compressed headers sent since the last full header exceeds a given threshold. Alternatively, a refresh of the full header occurs after the given period of time expires since the last full header was sent. To refresh the context for the packet stream established in step 204, a full header is sent 226 using the same CID and generation ID of the full header that was lost. If this full header is received by the decompressor 112, the full header is recovered 228.

Figure 3A:
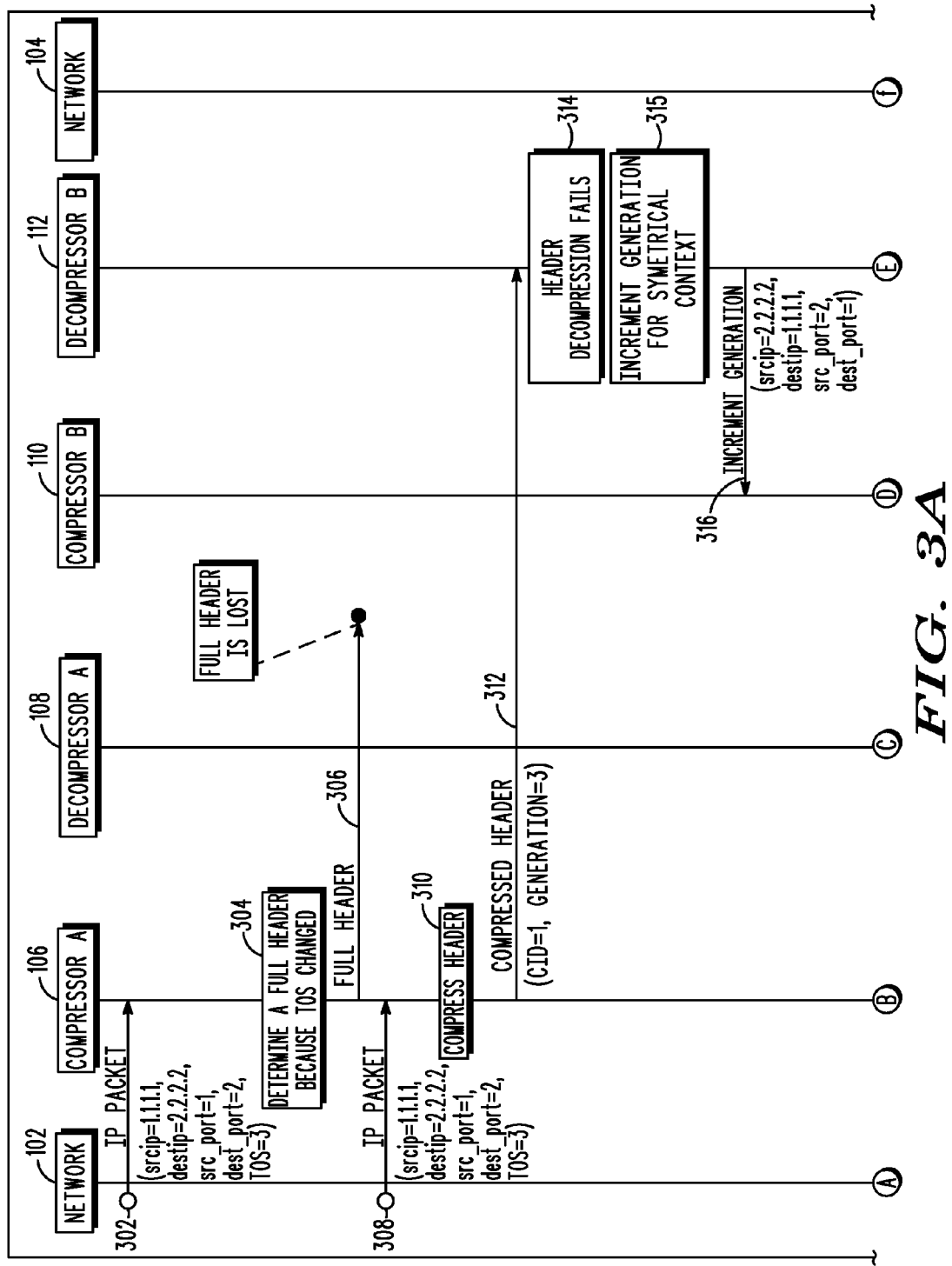
FIGS. 3A, 3B and 3C are an example of a message sequence chart of standard header compression where the full header is lost between the source and the destination and is recovered in accordance with some embodiments of the invention.
Figure 3B:
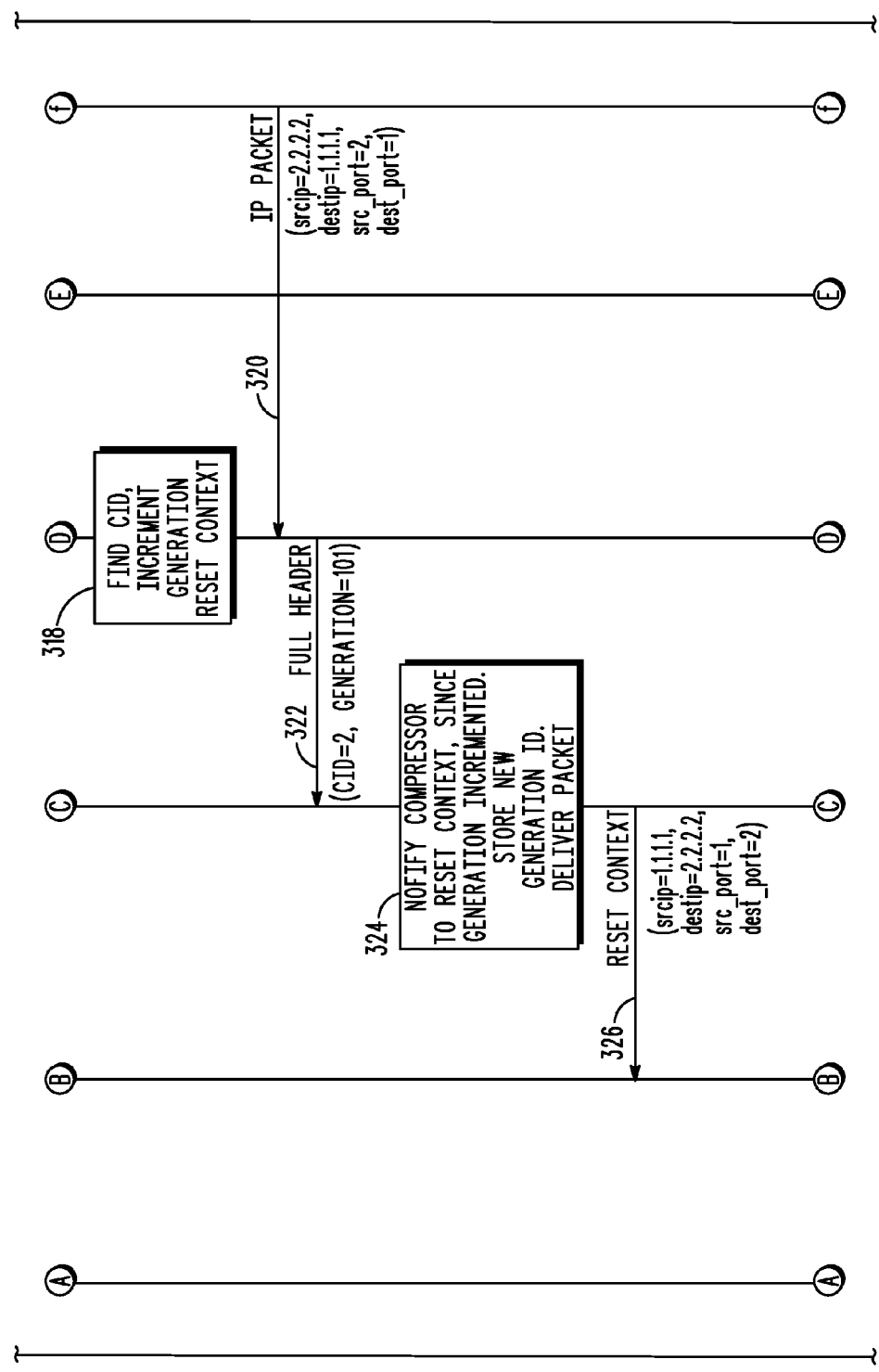
Figure 3C:
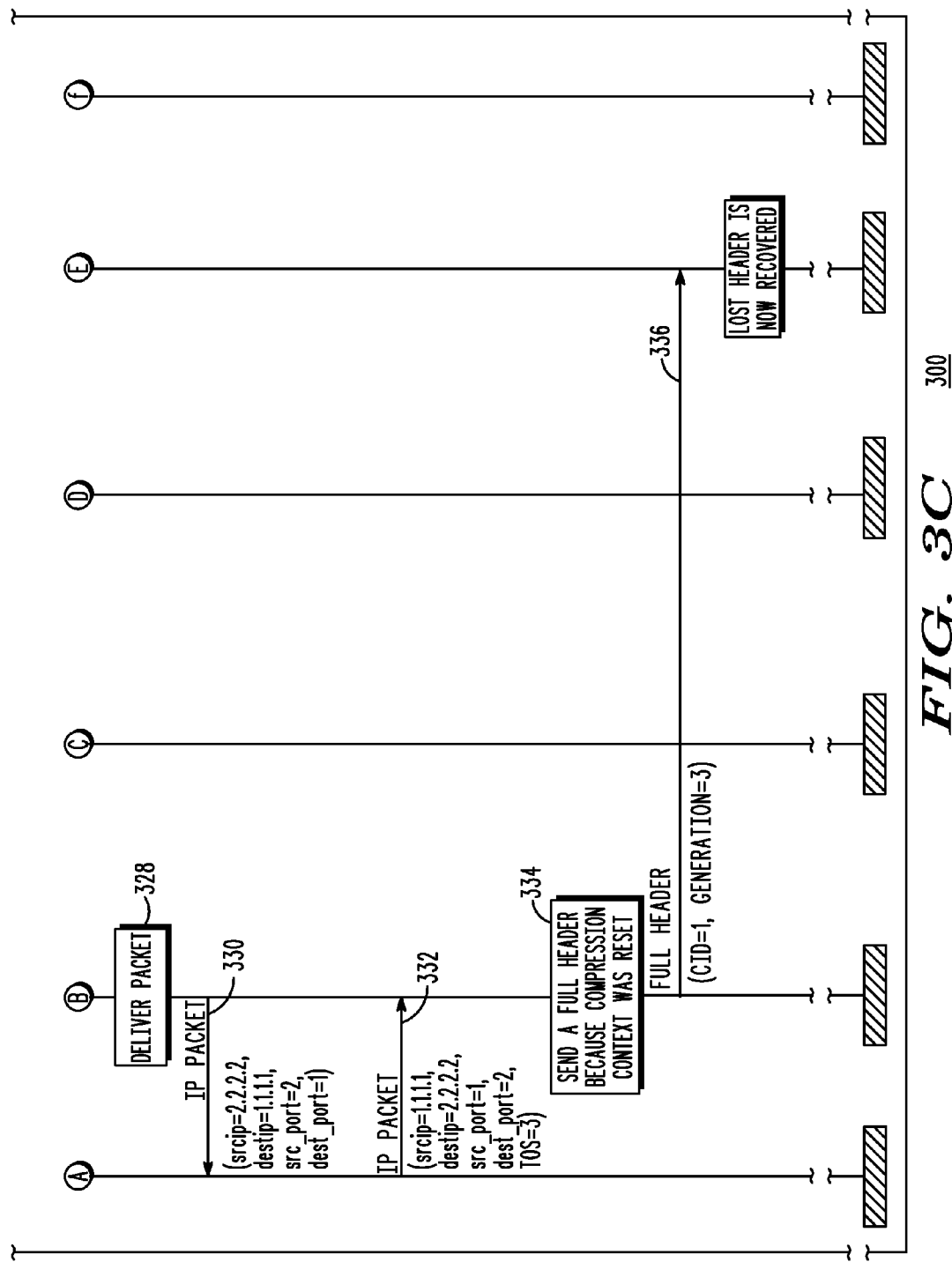

FIGS. 3A, 3B and 3C are a message control sequence 300 that illustrates header compression, and header compression for RFC 2507, where a full header is recovered by a network 104 and decompressor 112 after being lost between network 102 and network 104 according to an embodiment of the invention. The message sequence begins by network 102 sending 302 an IP packet to its compressor 106. As mentioned, the IP packet includes a source address, destination address, source port, destination port and TOS. When a TOS changes between packets or for other changes in the header, compressor 106 determines 304 a new full header is to be sent to decompressor 112 and network 104. The full header is assigned a CID and a generation ID. Compressor 106 sends 306 the full header to decompressor 112 and network 104. As can be understood, a full header can be lost between the compressor 106 and decompressor 112. When a full header is lost, the decompressor cannot decompress a compressed header when it is received because the decompressor does not have the necessary information stored to obtain the full header corresponding the compressed header.

After the full header is sent 306, the network 102 sends 308 the compressor 106 an IP packet, which is then compressed 310 into a compressed header. The compressed header is sent 312 from the compressor 106 to the decompressor 112 on network 104. The compressed header is sent with the CID and generation ID that was associated with the header that was lost. Header decompression fails 314 because the decompressor did not receive the full header, which is determined when the decompressor does not recognize the CID and generation ID of the compressed header.

In response to failing to recognize the CID and generation ID of the compressed header, the compressor 110 and decompressor 112 for network 104 attempt to recover the full header according to an embodiment of the invention. By recovering the full header when it is recognized that the full header was lost, network 104 does not need to wait until the full header is refreshed by waiting until the given number of compressed packets are sent or the allotted time has passed before compressor 106 and network 102 refresh the full header. Accordingly, the compressor 110 and decompressor 112 increment 315 the generation ID of the next IP packet that is being sent from network 104 to network 102. The increment of the generation ID is part of the symmetrical context of the networks 102, 104, compressors 106, 110 and decompressors 108, 112.

In view of the foregoing, decompressor 112 increments 315 the generation ID for the packet. The packet with the incremented generation ID of the previously sent packet from network 104 to network 102 and includes the source IP address of network 104, destination address of network 102, source port of network 104, destination port of network 102 and the appropriate TOS. This packet is sent 316 from the decompressor 112 to compressor 110. Compressor 110 finds 318 the appropriate CID, increments the generation ID and can reset the context. Another IP packet is sent 320 from network 104 to its compressor 110 with the source IP address, destination IP address, source port and destination port. The compressor uses the appropriate CID and the incremented generation ID and sends 322 the full header to the decompressor 108 for network 102.

The decompressor 108 receives the packet with the incremented generation ID that is different from the previous generation ID received from network 104. Based on the incremented generation ID, decompressor 108 notifies 324 compressor 106 to reset the context, send a header refresh for the full header and store a new generation ID. In addition, the packet is delivered to the compressor. As part of the delivery, the decompressor 108 sends 326 a packet to the compressor 106 to reset the context, which has a source IP address for network 102, a destination IP address for network 104, the network's 102 source port and network's 104 destination port. In response, the compressor 106 delivers 328 the packet and the packet is sent 330 from compressor 106 to network 102. Another packet is sent 332 from network 102 to compressor 106 with a source IP address and source port for network 102 and a destination IP address and destination port for network 104 as well as the assigned TOS. A full header is sent 334 from network 102 to network 104 because the context was reset by the compressor 110 and decompressor 112 of network 104. The full header is sent 336 with the CID and generation ID so as to recover the context of decompressor 112. Accordingly, decompressor 112 receives a full header because it incremented generation ID when it did not recognize a compressed header and before the compressor 106 refreshes the full header during standard operations of RFC 2507 header compression.

Figure 4:
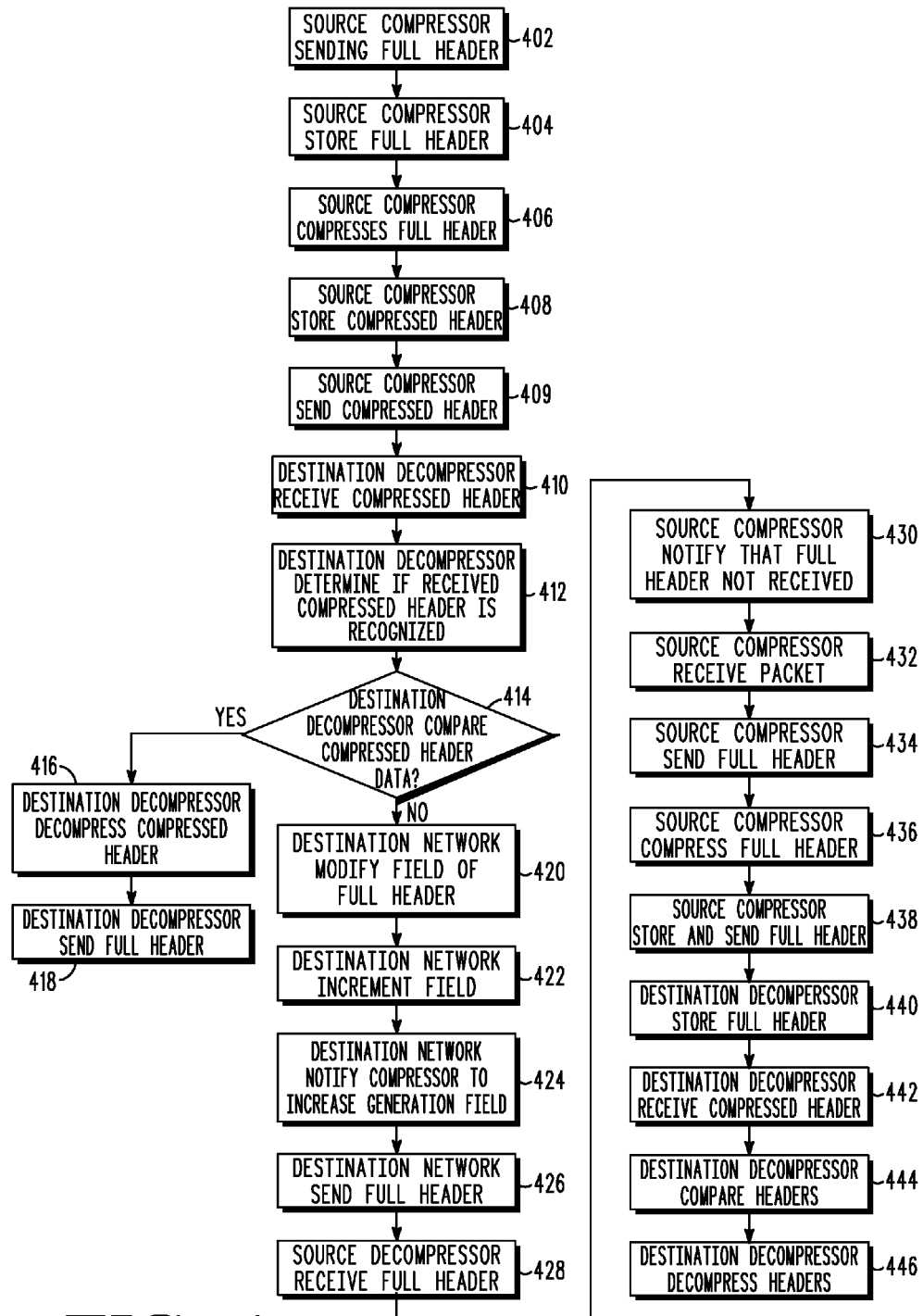
FIG. 4 is a flow chart illustrating recovery of a lost full header in accordance with some embodiments of the invention.

Turning to FIG. 4, a flow chart 400 is shown for full header recovery according to an embodiment of the invention. To begin, the process 400 begins with a compressor sending 402 a first full header, which a source compressor has received from a network, to a destination network and a destination decompressor. The header that is sent is sent with a designated CID and generation ID. In addition to sending the header to the destination network and decompressor, the source compressor stores 404 the header along with the assigned CID and generation ID and other relevant data concerning the header and packet. This header, however, can be lost between the source network and the destination network such that the destination network does not receive the full header. After sending the full header, the source compressor receives another packet to be sent to the destination network and destination decompressor. The source compressor compresses 406 the full header into a compressed header. The compressed header includes the CID and generation header of the full header to which the compressed header corresponds. The compressed header can also be stored 408 by the source compressor for future reference and sends 409 the compressed header to the destination decompressor.

At the destination decompressor, the compressed header sent by the source compressor is received 410. The decompressor determines 412 if the compressed header is recognized. In an embodiment, the decompressor compares 414 the CID and generation ID of the received compressed header with CIDs and generation IDs that it has stored from previously received full headers. If the decompressor recognizes the CID and generation ID, the decompressor decompresses 416 the compressed header into a full header and sends 418 the full header to the destination network.

If the decompressor does not recognize the CID and generation ID, the decompressor determines that a full header has been lost and prepares to recover a full header. By actively requesting a full header, the decompressor does not have to wait until the next full header sent by a source compressor is received by the destination decompressor. To avoid waiting for the compressor to refresh and send a full header after a given period of time or after given number of packets with compressed headers has been sent, the destination network modifies 420 a field in a full header. In an embodiment, the destination network increments 422 a field in a full header that is being sent from the destination network to the source network. In an embodiment, the destination decompressor notifies 424 the destination compressor to increment the generation ID in the full header. The destination network and compressor sends 426 the full header with the modified field or the incremented generation ID to the source network.

The source decompressor receives 428 the full header from the destination network with the modified field or generation ID and is therefore notified 430 that the full header was not received by the destination network and destination decompressor. The source compressor then receives 432 another packet from the network. The source compressor then sends 434 another full header to the destination network. This full header subsequently sent by the source can use the same CID and generation ID or it may modify this IDs as required by the network conditions. After sending this full header, the compressor returns to compressing 436 full headers into compressed headers and storing 438 the full headers and compressed headers as required. At the receiver, the decompressor stores 440 the full header if it is received. When a compressed header is received 442, it compares 444 the CID and generation ID of the received compressed header to decompress 446 the header. If the CID and generation ID are recognized, the full header has been recovered.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
   sending a first full header from a source compressor to a destination decompressor wherein the source compressor and the destination decompressor are a part of a symmetrical configuration;
   compressing the full header into a first compressed header;
   sending the first compressed header from the source compressor to the destination decompressor;
   receiving a second full header from the destination compressor wherein the second full header indicates that the destination decompressor did not receive the first full header, wherein the second full header includes a source address, a destination address, a source port, a destination port, a context identification and a generation identification and further wherein the generation identification of the second full header indicates that the destination decompressor did not receive the first full header; and
   sending a third full header from the source compressor to the destination decompressor in response to receiving the second full header from the destination decompressor.

2. The method of claim 1 wherein the first and third full headers include a context identification and a generation identification.

3. The method of claim 2 wherein the generation identification of the second full header is incremented from a previous generation identification.

4. The method of claim 1 wherein the generation identification of the second full header is a modified generation identification to indicate that the destination decompressor did not receive the first full header.

5. The method of claim 1 wherein the headers are UDP headers.

6. The method of claim 1 further comprising detecting the destination decompressor did not receive the first full header upon receiving the second full header.

7. The method of claim 6 wherein the detecting the destination decompressor did not receive the first full header comprising detecting that the generation identification of the second full header is incremented.

8. The method of claim 1 further comprising storing the first full header.

9. The method of claim 8 further comprising comparing the second full header to the stored first full header to determine if the destination decompressor received the first full header.

10. The method of claim 9 wherein comparing the second full header to the stored first full header comprising determining that the generation identification of the second full header is incremented from the stored first full header.

11. A method comprising:
    receiving a compressed header;
    determining if the compressed header is recognized;
    incrementing a generation identification field in a first full header when it is determined that the compressed header is not recognized, wherein the first full header includes a source address, a destination address, a source port, a destination port, a context identification and the generation identification;
    sending the first full header with the incremented generation identification field from a destination decompressor to a source decompressor, wherein the incremented generation identification indicates that the compressed header is not recognized by the destination decompressor; and
    receiving a second full header.

12. The method of claim 11 wherein the second full header includes a context identification and a generation identification.

13. The method of claim 11 wherein a destination includes the destination decompressor and a destination compressor and a source includes the source decompressor and a source compressor.

14. The method of claim 13 wherein the source and the destination have a symmetrical configuration.

15. The method of claim 11 wherein the headers are UDP headers.

16. The method of claim 11 further comprising receiving a second compressed header.

17. The method of claim 16 further comprising determining that the second compressed header corresponds to the second full header.

18. The method of claim 11 further comprising:
    receiving the first full header;
    storing the first full header, and
    storing the decompressed header.

19. The method of claim 18 wherein determining if the first compressed header is recognized comprises comparing the decompressed header to the stored decompressed header.

* * * * *

UNITED STATES PATENT AND TRADEMARK OFFICE
CERTIFICATE OF CORRECTION

PATENT NO. : 8,059,651 B2
APPLICATION NO. : 11/958014
DATED : November 15, 2011
INVENTOR(S) : Varela et al.

It is certified that error appears in the above-identified patent and that said Letters Patent is hereby corrected as shown below:

In the Drawings:

In Fig. 3a, Sheet 5 of 8, for Tag "315", in Line 2, delete "SYMETRICAL" and insert -- SYMMETRICAL --, therefor.

In Fig. 3b, Sheet 6 of 8, for Tag "324", in Line 1, delete "NOFIFY" and insert -- NOTIFY --, therefor.

In Fig. 4, Sheet 8 of 8, insert Tag -- 400 --, below the Figure.

In Fig. 4, Sheet 8 of 8, for Tag "440", in Line 1, delete "DECOMPERSSOR" and insert -- DECOMPRESSOR --, therefor.

Signed and Sealed this
Sixteenth Day of April, 2013

Teresa Stanek Rea
*Acting Director of the United States Patent and Trademark Office*